United States Patent [19]

Thuen et al.

[11] Patent Number: 5,178,410
[45] Date of Patent: Jan. 12, 1993

[54] VELOCITY CHANGE SENSOR WITH LATERAL SHOCK ABSORBER

[75] Inventors: Torbjorn Thuen, Morris Plains; Allen Breed, Boonton Township, Morris County; Carl. T. Grossi, Wharton, all of N.J.

[73] Assignee: Breed Automotive Technology, Inc., Boonton Township, Morris County, N.J.

[21] Appl. No.: 815,436

[22] Filed: Dec. 31, 1991

Related U.S. Application Data

[63] Continuation-in-part of Ser. No. 715,493, Jun. 14, 1991.

[51] Int. Cl.⁵ .............................................. B60R 21/32
[52] U.S. Cl. ................................. 280/734; 280/735; 200/61.45 M
[58] Field of Search ............... 280/734, 735; 180/282; 200/61.45 R, 61.45 M, 61.53, DIG. 29

[56] References Cited

U.S. PATENT DOCUMENTS

| | | | |
|---|---|---|---|
| 4,329,549 | 5/1982 | Breed | 200/61.45 M |
| 4,666,182 | 5/1987 | Breed | 280/734 |
| 4,915,411 | 4/1990 | Norton | 280/734 |
| 5,005,861 | 4/1991 | Breed et al. | 280/734 |

*Primary Examiner*—Kenneth R. Rice
*Attorney, Agent, or Firm*—Kane, Dalsimer, Sullivan, Kurucz, Levy, Eisele and Richard

[57] ABSTRACT

An accelerometer for a passenger restraint system in a motor vehicle includes a housing with tube for defining a path for an inertial element, and a biasing member for urging the inertial element toward a preselected position. A shock absorbent resilient ring is disposed between the tube and the housing and supports the tube.

26 Claims, 2 Drawing Sheets

VELOCITY CHANGE SENSOR WITH LATERAL SHOCK ABSORBER

RELATED APPLICATIONS

This is a continuation-in-part application to application Ser. No. 715,493, entitled AN IMPROVED MECHANICAL CRASH SENSOR and was filed on Jun. 14, 1991, now pending.

BACKGROUND OF THE INVENTION

1. Field of the Invention

This invention pertains to a velocity change sensor used in motor vehicles for detecting sudden changes in velocity and for activating in response a passenger restraining device such as an air bag. More particularly, this device includes an inertial or sensing element which moves through a tube to a preset position in response to a sudden deceleration to a close pair of contact blades through a tube, said tube being supported by a shock absorbing ring means.

2. Background of the Invention

Studies have been made which indicate that injuries in motor vehicle accidents, especially at high speeds, can be substantially reduced or eliminated by the use of passenger restraint systems. (The term "passenger" is used to indicate the driver of a car as well.) These systems include an inflatable balloon, usually termed an air bag, which normally is stored away in the instrument panel or the steering wheel. When the motor vehicle is subjected to a sudden deceleration, the air bag is inflated and deployed automatically in a position which cushions the passengers, restrains their movement and prevents contact between them and the automobile interior such as the windshield, or the steering wheel, or the instrument panel, and so on. Of course, a crucial element of all such systems is the velocity change sensor or accelerometer which initiates the inflation and deployment of the air bags. The motion of the motor vehicle must be carefully and precisely monitored so that the air bags can be deployed very fast, before the passengers suffer any substantial injury.

A velocity change sensor is disclosed in U.S. Pat. No. 4,329,549 assigned to the same company as the present invention. This sensor comprises a tubular housing surrounding a metallic shell, a metal ball, and a magnet, biasing the ball toward a first end of the shell. At the second end of the shell there are a pair of electrical contact blades. The sensor is positioned in the motor vehicle in an orientation such that when the motor vehicle experiences a deceleration which exceeds a preset level, the ball moves from the first end, toward the second end, making contact with the two contact blades. Because the contact blades and the ball are made of an electrically conducting material, when the ball contacts the contact blades, an electrical path is established between the two blades. This electrical path is used to initiate a signal for the deployment of the air bags.

One problem with the structure shown in U.S. Pat. No. 4,329,549 is that during declaration, the movement of the ball may be affected by forces normal to the shell axis.

OBJECTIVES AND SUMMARY OF THE INVENTION

An objective of the present invention is to provide a passenger restraint system with a small and inexpensive accelerometer. A further objective is to provide a sensor insensitive to cross-axis vibrations.

Other objectives and advantages of the invention shall become apparent from the following description of the invention.

A passenger restraint system constructed in accordance with this invention comprises a housing with an inertial element movable in a predetermined path, said path being provided in the housing by a metallic tube positioned by a shock absorbing means. Preferably, a permanent magnet is mounted outside the housing radially around the tube, thereby, limiting the axial length of the housing. The magnet biases the inertial element toward one end of the tube. Alternatively, the ball may be spring biased. In a crash, deceleration causes the inertial element to move along the path closing a pair of electrical contacts coupled to an activation circuit for activating a restraint device such as an air bag. The tube is supported within the housing by a flexible resilient material which also stops air from flowing around the tube as the ball moves therethrough.

DETAILED DESCRIPTION OF THE INVENTION

In the following description, terms such as up, down, above, below, vertical, horizontal, and so on, are used merely for facilitating the description of the invention. Turning now to the Figures, an accelerometer or velocity change sensor 10 constructed in accordance with this invention is usually disposed in a case mounted on the motor vehicle (not shown). The sensor is connected to at least two conductors 12, 14 and to a control device for the deployment of the air bag, described in more detail below.

Figure 1:
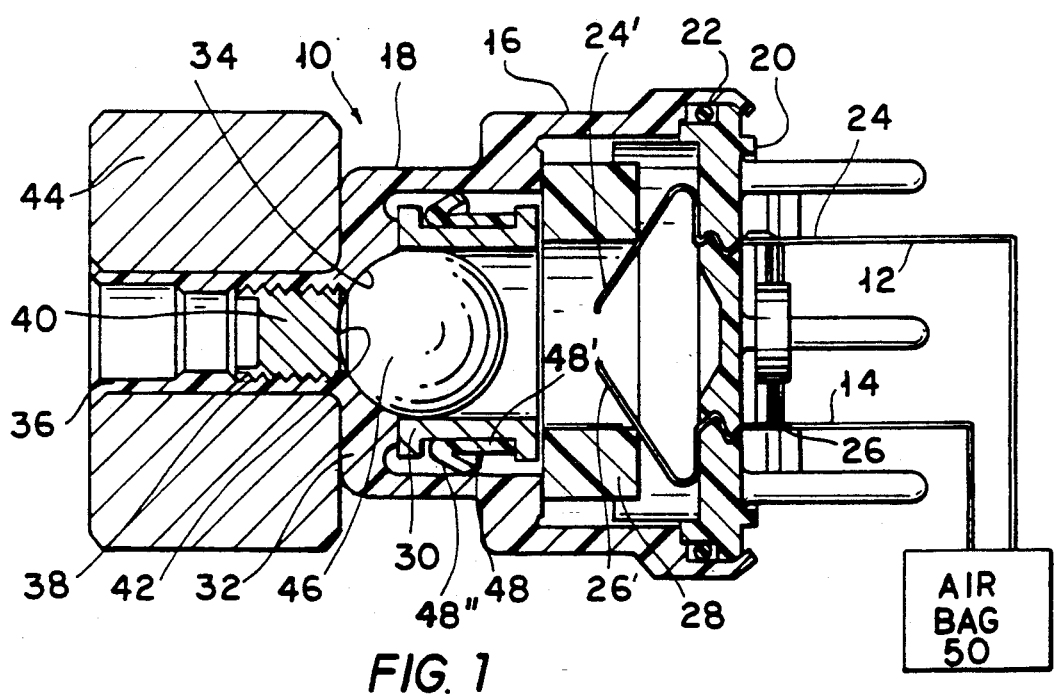
FIG. 1 shows a side elevational view of a first embodiment of the invention.

The sensor has a generally tubular housing 16 made of non-conducting material such as a moldable plastic material. One end of the housing is stepped radially inwardly as at 18. The housing is closed off at one end by a cap 20 affixed to housing 16 by staking, epoxy or other well known means. In addition, an O-ring 22 is used to insure that the housing is hermetically sealed. Inside the housing, there are provided two contact blades 24, 26 which are mounted on cap 20. As shown in FIG. 1 each blade is made of a single metallic strip shaped to be retained by the cap 20. Each blade has a distal end 24', 26' extending into the housing as shown. The cap 20 is typically made of the same material as the housing 16 and may be molded around the blades 24, 26.

Also, inside the housing is a ring 28 disposed on shoulder 30 of the housing and positioned to prestress the contact blades and position them at an equal distance from cap 20. The purpose of ring 28 is discussed in more detail in U.S. Pat. No. 5,011,182. Adjacent to ring 28, the housing is provided with a tube 30 extending coaxially within the housing 16.

At the end opposite cap 20, housing 16 has an end wall 32 shaped with a hemispherical depression 34.

Attached to wall 32 is a sleeve 36 internally threaded as at 38. Inside sleeve 36 there is an adjustment screw 40 with an end surface 42. The screw 40 is engaged within the threaded sleeve so that it can be moved axially by rotation. By moving the screw 40 axially, the sensitivity of the accelerometer may be set within a preselected range of, for example, 6–11 mph.

Mounted on sleeve 36 outside the housing 16 is an annular permanent magnet 44. Inside the tube 30 there is also an inertial mass in the shape of a ball 46, made of a ferromagnetic material. The ball 46 may be covered with a coating having a low electrical resistance. Magnet 44, ball 46, sleeve 36, and the tube 30 are disposed concentrically about the longitudinal axis of the housing 16.

Between tube 30 and the inside of housing 16 there is an annular space which is used for a shock absorbing ring 48 made of a resilient material. Ring 48 is disposed in a circumferential groove 49 on sleeve 30. Preferably, ring 48 consists of an inner tubular member 48' mounted on tube 30 and a second member 48" jointed to member 48' at an angle as shown, so that the tip 51 of member 48" is biased against the inside surface of housing 16. The angle between members 48' and 48" may be about 20°–30° and more particularly about 26°. This ring 48 maintains tube 30 in position within the housing. Moreover, ring 48 also limits the amount of air passing between tube 30 and housing 16, whereby air is not recirculated around the shell as the ball moves therethrough.

The sensor operates as follows. Under normal acceleration/deceleration or constant speed conditions, the ball 46 is biased towards end wall 32 by magnet 44. The exact position of the ball 46 is set by adjusting the position of screw. When the motor vehicle is involved in a crash at a speed exceeding a preset threshold, the force due to the resulting deceleration causes the ball to move away from the end wall 32 and toward cap 20 in a path defined by tube 30. If the deceleration is severe enough and lasts long enough, the ball 46 exits from the tube 30 and passes through tube 28. Tube 28 is positioned so that the ball 46 hits the contacts 24, 26. Since the ball has a conductive surface, electric current can flow from one contact to the other through the ball. Contacts 24, 26 are connected by conductors 12, 14 to an air bag system 50 arranged so that it is triggered and deployed by the sensor 10. As the deceleration weakens or ceases, magnet 44, draws the ball 46 back towards its initial position as shown in FIG. 1. Importantly, the inner diameter of tube 30 is just slightly larger than the diameter of ball 46, so that, as the ball moves through the tube, its motion is damped by the air in the tube. This damping effect is rendered more effective by the ring 4 which forces air displaced by the ball to flow through the narrow gap between the ball 46 and tube 30, instead of flowing through a leakage path around the tube 30. Moreover, the present inventors found that if a sensor is used without the lateral shock absorbing ring 48, during a collision, the ball may be subjected to cross-axis vibration, i.e. vibration in the direction perpendicular to the path of the ball. Due to this vibration, the ball may remain stationary and therefore, the sensor may malfunction. The shock absorbing ring 48 isolates ball 46 from cross-axis vibration. The v-shaped ring 48, shown in FIG. 1 was found to be particularly effective against crossaxis vibration.

Figure 2:
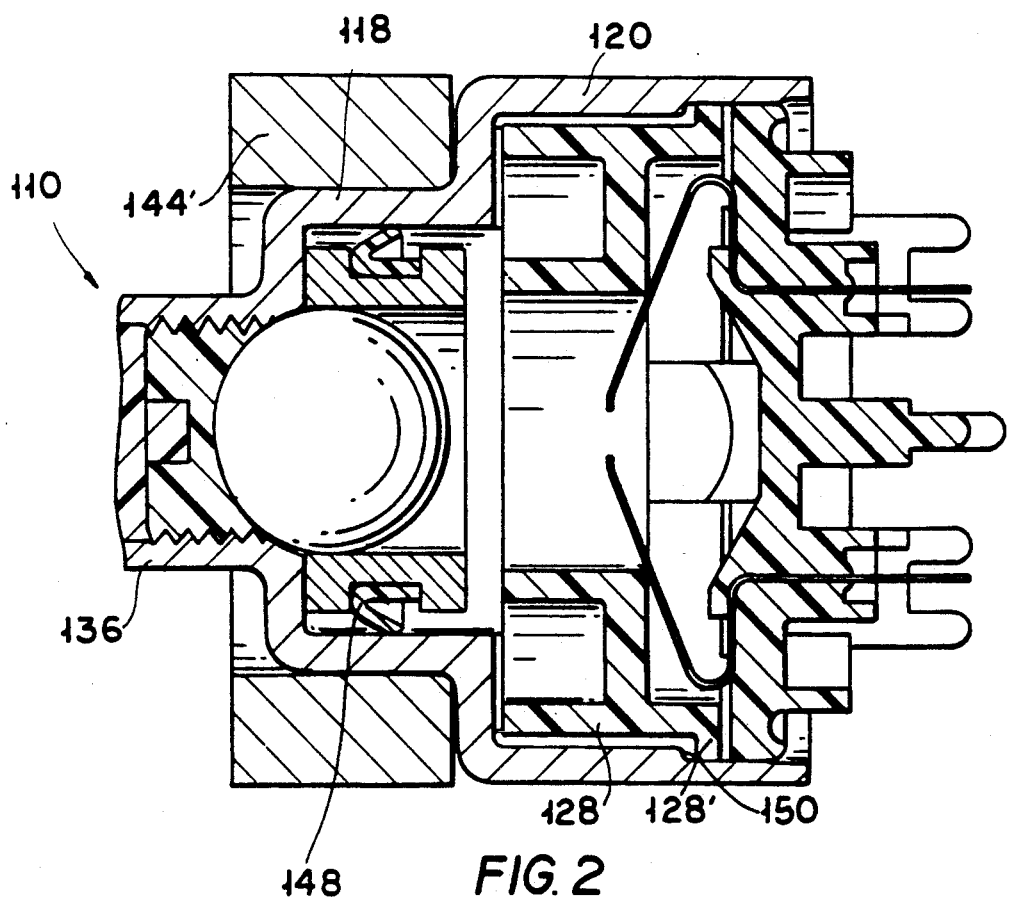
FIG. 2 shows a side elevational partial sectional view of a second embodiment of the invention.

An alternate embodiment of the invention is shown in FIG. 2. The change of velocity sensor 110 shown in this Figure includes a magnet 144 mounted, not on sleeve 136, but on step-down section 118 of housing 116. In this configuration, the magnetic field generated by the magnet 144 is more concentrated on ball 146. Thus, the overall size of magnet 144 and/or sensor 110 is reduced.

Figure 3:
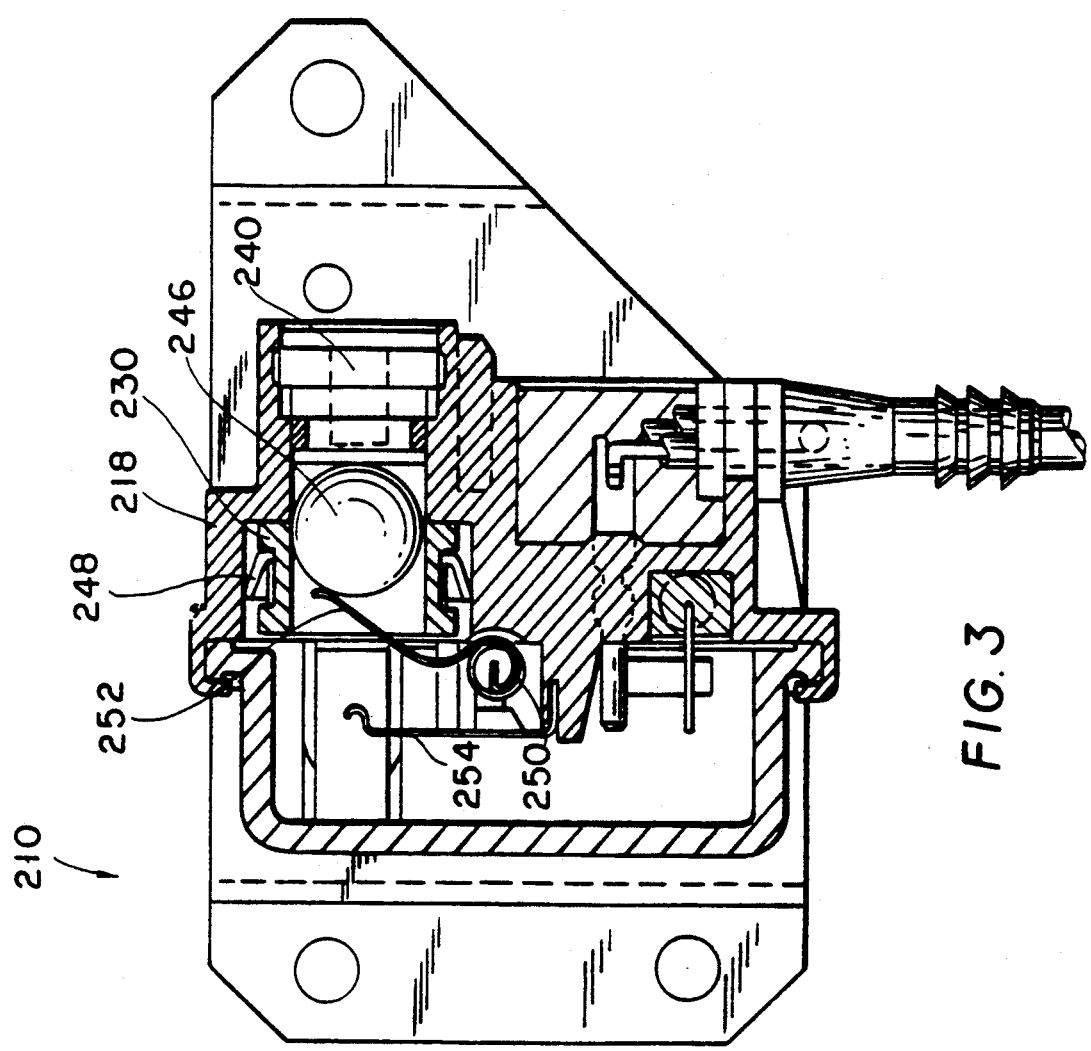
FIG. 3 shows a side elevational view of another alternate embodiment of the invention.
Figure 4:
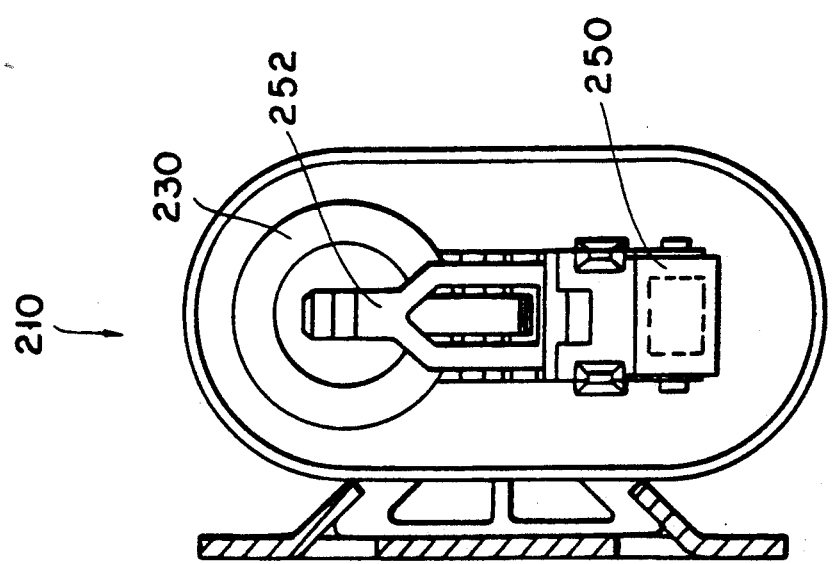
FIG. 4 shows a side view of the embodiment of FIG. 3.

In the alternate embodiment of FIGS. 3 and 4, a velocity sensor 210 is shown having a ball 246 biased by a coil spring 250. Spring 250 is terminated in a spring blade 252 contacting ball 246. Ball 246 is disposed in a tube 230 supported within a housing 218 by a v-shaped ring 248. The sensor is mounted in a motor vehicle so that in case of crash, ball 246 moves to the left through tube 230 causing spring blade 252 to pivot counterclockwise until it hits a stationary blade 254. Like in the previous embodiments, ring 248 absorbs cross axial shock and also controls the air damping of ball 246. The initial or rest position of ball 246 is adjusted by a screw 240.

Obviously, numerous modifications can be made to the invention without departing from its scope as defined in the appended claims.

We claim:

1. In a passenger restraint system for a motor vehicle, an accelerometer comprising:
   a. a tubular housing;
   b. an inertial element made of a ferromagnetic material;
   c. a tube disposed in said housing forming an annular space with said housing, said tube defining a path of movement for said inertial element;
   d. biasing means for urging said inertial element toward a preselected position on said path, said tube being arranged and constructed to allow said inertial element to move away from said preselected position in the presence of a deceleration of said motor vehicle; and
   e. resilient shock absorbing means disposed in said space for supporting said tube.

2. The accelerometer of claim 1 further including contact means disposed in said housing for closing an electric path when said inertial element is in a second position.

3. The accelerometer of claim 1 wherein said biasing means includes a magnet mounted on said tubular housing.

4. The accelerometer of claim 1 wherein said biasing means comprises a spring.

5. The accelerometer of claim 3 wherein said magnet means is at least partially coextensive with said tube.

6. The accelerometer of claim 1 wherein said biasing means is a spring.

7. An accelerometer for a passenger restraint system in a motor vehicle comprising:
   a. a substantially tubular housing;
   b. an inertial element made of a ferromagnetic material and disposed within said housing;
   c. tube means disposed coaxially within said housing for defining a path of movement for said inertial element, said tube defining an annular space with an inner surface of said housing;
   d. biasing means disposed on said housing radially for urging, said inertial element toward a first position in said housing, said inertial element moving away from said first position through said tube when said motor vehicle undergoes an acceleration; and
   e. shock absorbing means disposed in said annular space for supporting said tube.

8. The accelerometer of claim 7 further comprising contact means disposed in said housing for indicating when said inertial element is in said second position.

9. The accelerometer of claim 7 wherein said shock absorbing means comprises a ring of a resilient material.

10. The accelerometer of claim 7 herein said annular space is in communication with the inside of the tube.

11. The accelerometer of claim 7 wherein said housing has an axial extension, and said biasing means includes a permanent magnet is disposed on said axial extension.

12. The accelerometer of claim 7 wherein said permanent magnet is disposed radially around said tube.

13. The accelerometer of claim 12 wherein said housing has a stepped down section and said permanent magnet is disposed on said stepped down section.

14. The accelerometer of claim 7 further including adjusting means forming an end wall of said housing for adjusting the speed of activation of said accelerometer, said inertial element being in contact with said adjusting means in said first position.

15. The accelerometer of claim 7 where said biasing means comprises a spring.

16. A passenger restraint system for a motor vehicle comprising:
   a. an air bag system arranged and disposed for restraining a passenger when the motor vehicle experiences a deceleration;
   b. an accelerometer for sensing said deceleration for activating said air bag inflating system, said accelerometer comprising:
      i. a housing;
      ii. an inertial element disposed in said housing;
      iii. a tube disposed in said housing for defining a path of movement for said inertial element within said housing; and
      iv. biasing means disposed on said housing radially around said tube for urging said inertia element toward a first position in the absence of said deceleration.

17. The system of claim 16 further comprising sensitivity adjusting means for adjusting the sensitivity of said accelerometer, said adjusting means being disposed at an end wall of said housing, and being axially adjustable.

18. The system of claim 16 wherein said housing has a steppeddown section and said biasing means includes a permanent magnet disposed on said stepped-down portion.

19. The system of claim 18 further comprising sensitivity adjusting means for adjusting the sensitivity of said accelerometer, said adjusting means being disposed at an end wall of said housing, and being axially adjustable.

20. The system of claim 18 wherein said housing has stepped-down section and said permanent magnet is disposed on said steppeddown portion.

21. The system of claim 18 wherein said housing includes a cap and contact means mounted on said cap, said inertial element cooperating with said contact means for closing an electrical path when it moves to a second position.

22. The system of claim 18 further comprising shock absorbing means deposed between said tube and said housing for isolating said inertial element from cross-axis vibrations.

23. The system of claim 22 wherein said shock absorbing means includes a resilient ring.

24. The system of claim 23 wherein said ring has a V-shaped cross-section defined by a first member mounted on said tube and a second member disposed at an angle with respect to said first member.

25. The system of claim 24 wherein said angle is in the range of 20°-30°.

26. The system of claim 16 wherein said biasing means comprises a spring.

* * * * *